(12) United States Patent
Maamari et al.

(10) Patent No.: US 12,550,162 B2
(45) Date of Patent: Feb. 10, 2026

(54) DOWNLINK ONLY STATES FOR WIRELESS COMMUNICATION

(71) Applicant: QUALCOMM Incorporated, San Diego, CA (US)

(72) Inventors: Diana Maamari, San Diego, CA (US); Mickael Mondet, Louannec (FR); Ahmed Attia Abotabl, San Diego, CA (US); Ahmed Elshafie, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/183,324

(22) Filed: Mar. 14, 2023

(65) Prior Publication Data
US 2024/0314803 A1    Sep. 19, 2024

(51) Int. Cl.
*H04W 72/232*    (2023.01)
*H04W 72/12*    (2023.01)

(52) U.S. Cl.
CPC ......... *H04W 72/232* (2023.01); *H04W 72/12* (2013.01)

(58) Field of Classification Search
CPC ............... H04W 72/232; H04W 72/12; H04W 52/0216; H04W 52/0248; H04W 72/21; H04L 5/0053
See application file for complete search history.

(56) References Cited

U.S. PATENT DOCUMENTS

| | | | |
|---|---|---|---|
| 2013/0022011 A1* | 1/2013 | Enomoto | H04L 1/1671 370/329 |
| 2015/0223232 A1* | 8/2015 | Eriksson | H04W 72/0446 370/329 |
| 2016/0072668 A1* | 3/2016 | Zeng | H04W 28/082 370/254 |
| 2022/0312438 A1* | 9/2022 | Yi | H04W 72/1263 |
| 2022/0330153 A1 | 10/2022 | Hande et al. | |

OTHER PUBLICATIONS

International Search Report and Written Opinion—PCT/US2024/018296—ISA/EPO—Jun. 20, 2024.
OPPO: "SR Triggering and DRX Operation", 3GPP TSG-RAN WG2 Meeting #106, R2-1905606, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, 3 Pages, XP051729109, Section 2, p. 1-p. 2.

* cited by examiner

*Primary Examiner* — Kiet Tang
(74) *Attorney, Agent, or Firm* — Harrity & Harrity, LLP

(57) ABSTRACT

Wireless communications systems, apparatuses, and methods are provided. A method of wireless communication performed by a user equipment (UE) includes transmitting, to a network unit, a scheduling request associated with uplink resources, receiving, from the network unit, an indicator indicating the UE to enter a downlink only state, monitoring for first downlink control information (DCI) without entering the downlink only state, wherein the DCI comprises an indicator of the uplink resources, and transmitting, to the network unit after the receiving the indicator indicating the UE to enter the downlink only state, one or more transport blocks (TBs) via the uplink resources.

30 Claims, 9 Drawing Sheets

DOWNLINK ONLY STATES FOR WIRELESS COMMUNICATION

TECHNICAL FIELD

This application relates to wireless communication systems, and more particularly, to downlink only states for wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include transmitting, to a network unit, a scheduling request associated with uplink resources; receiving, from the network unit, an indicator indicating the UE to enter a downlink only state; monitoring for first downlink control information (DCI) without entering the downlink only state, wherein the DCI comprises an indicator of the uplink resources; and transmitting, to the network unit after the receiving the indicator indicating the UE to enter the downlink only state, one or more transport blocks (TBs) via the uplink resources.

In an additional aspect of the disclosure, a method of wireless communication performed by a network unit may include receiving, from a user equipment (UE), a scheduling request associated with uplink resources; transmitting, to the UE, an indicator indicating the UE to enter a downlink only state; transmitting, to the UE, first downlink control information (DCI), wherein the DCI comprises an indicator of the uplink resources; and receiving, from the UE after the transmitting the indicator indicating the UE to enter the downlink only state, one or more transport blocks (TBs) via the uplink resources.

In an additional aspect of the disclosure, a user equipment (UE) may include a memory; a transceiver; and at least one processor coupled to the memory and the transceiver, wherein the UE is configured to: transmit, to a network unit, a scheduling request associated with uplink resources; receive, from the network unit, an indicator indicating the UE to enter a downlink only state; monitor for first downlink control information (DCI) without entering the downlink only state, wherein the DCI comprises an indicator of the uplink resources; and transmit, to the network unit after the receiving the indicator indicating the UE to enter the downlink only state, one or more transport blocks (TBs) via the uplink resources.

In an additional aspect of the disclosure, a network unit may include a memory; a transceiver; and at least one processor coupled to the memory and the transceiver, wherein the network unit is configured to: receive, from a user equipment (UE), a scheduling request associated with uplink resources; transmit, to the UE, an indicator indicating the UE to enter a downlink only state; transmit, to the UE, first downlink control information (DCI), wherein the DCI comprises an indicator of the uplink resources; and receive, from the UE after the transmitting the indicator indicating the UE to enter the downlink only state, one or more transport blocks (TBs) via the uplink resources.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
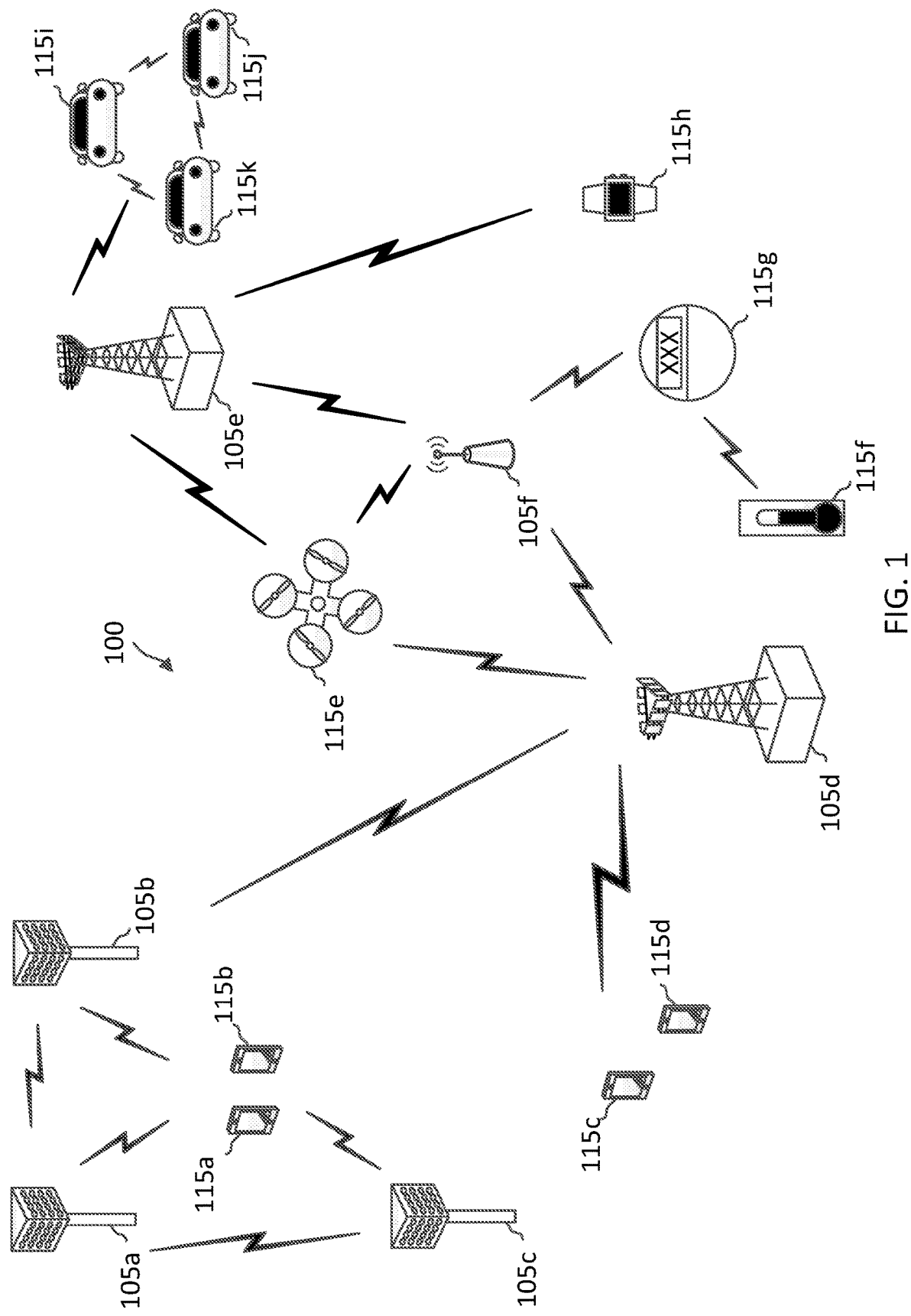
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type. The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-hop configurations by communicating with another user device which relays its information to the network, such as the UE 115$f$ communicating temperature measurement information to the smart meter, the UE 115$g$, which is then reported to the network through the small cell BS 105$f$. In some aspects, the UE 115$h$ may harvest energy from an ambient environment associated with the UE 115$h$. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115$i$, 115$j$, or 115$k$ and other UEs 115, and/or vehicle-to-infrastructure (V2I) communications between a UE 115$i$, 115$j$, or 115$k$ and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, a UE 115 may transmit a scheduling request associated with uplink resources to a BS 105. The UE 115 may receive, from the network unit, an indicator indicating the UE 115 to enter a downlink only state. The UE 115 may monitor for first downlink control information (DCI) without entering the downlink only state. The DCI may comprise an indicator of the uplink resources. The UE 115 may transmit, to the network unit after the receiving the indicator indicating the UE 115 to enter the downlink only state, one or more transport blocks (TBs) via the uplink resources.

In some aspects, a BS 105 may receive a scheduling request associated with uplink resources from a UE 115. The BS 105 may transmit, to the UE 115, an indicator indicating the UE 115 to enter a downlink only state. The BS 105 may transmit, to the UE 115, first downlink control information (DCI). The DCI may comprise an indicator of the uplink resources. The BS 105 may receive, from the UE 115 after transmitting the indicator indicating the UE 115 to enter the downlink only state, one or more transport blocks (TBs) via the uplink resources.

Figure 2:
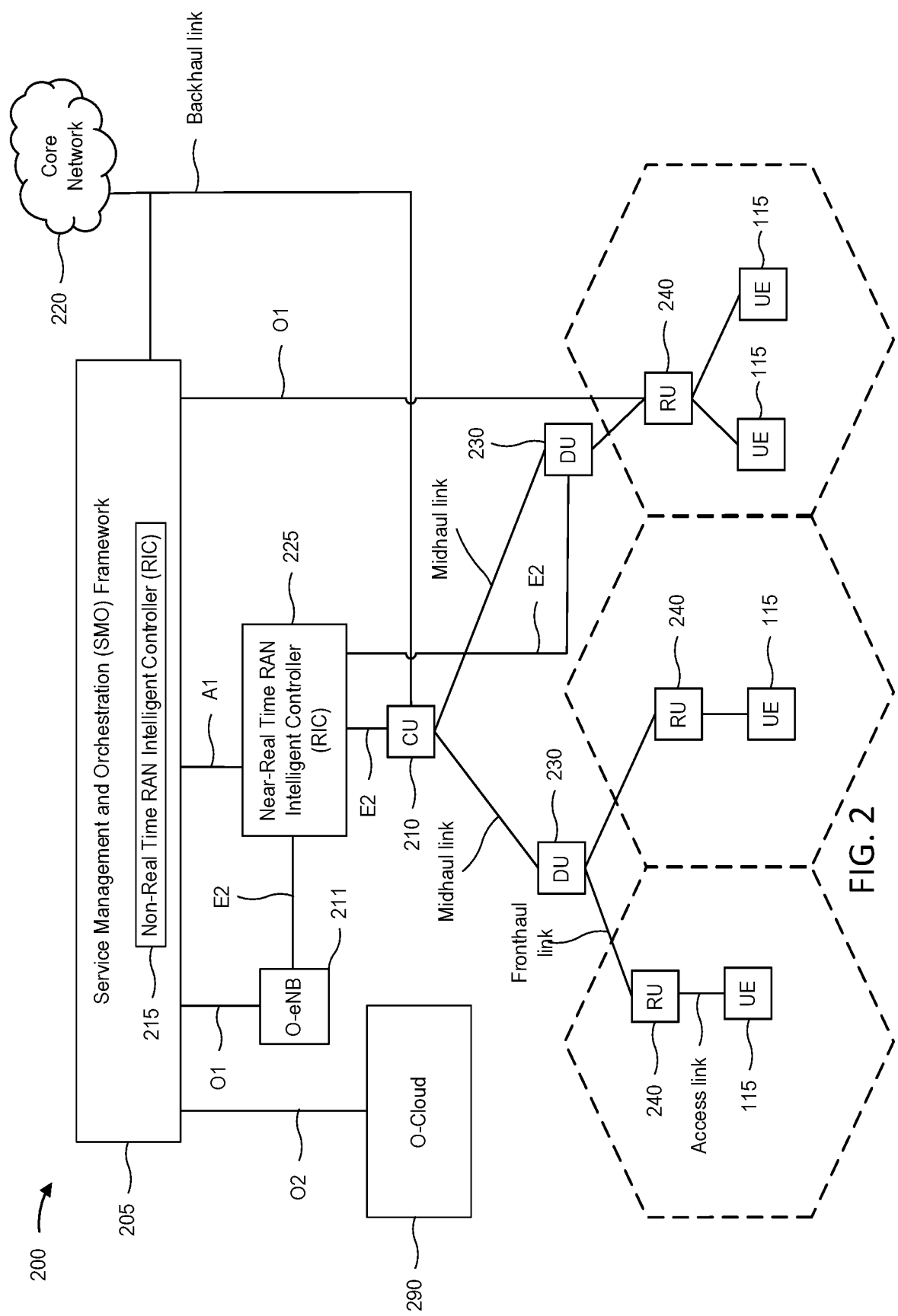
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, the RU 240 may perform a first listen-before-talk (LBT) procedure in a shared frequency band, wherein a category of the first LBT procedure is based on a first channel access priority class (CAPC) index value associated with a plurality of transport blocks (TBs). The RU 240 may transmit, to the UE 115 based on the first LBT procedure being successful, one or more TBs of the plurality of TBs. The RU 240 may perform a second LBT procedure, wherein at least one parameter of the second LBT procedure is based on a survival time associated with the one or more TBs.

In some aspects, a UE 115 may transmit a scheduling request associated with uplink resources to a network unit (e.g., the network unit 700, the BS 105, the RU 240, the DU 230, and/or the CU 210). The UE 115 may receive, from the network unit, an indicator indicating the UE to enter a downlink only state. The UE 115 may monitor for first downlink control information (DCI) without entering the downlink only state. The DCI may comprise an indicator of the uplink resources. The UE 115 may transmit, to the network unit after the receiving the indicator indicating the UE 115 to enter the downlink only state, one or more transport blocks (TBs) via the uplink resources.

In some aspects, a network unit (e.g., the network unit 700, the BS 105, the RU 240, the DU 230, and/or the CU 210) may receive a scheduling request associated with uplink resources from a UE 115. The network unit may transmit, to the UE 115, an indicator indicating the UE 115 to enter a downlink only state. The network unit may transmit, to the UE 115, first downlink control information (DCI). The DCI may comprise an indicator of the uplink resources. The network unit may receive, from the UE 115 after transmitting the indicator indicating the UE 115 to enter the downlink only state, one or more transport blocks (TBs) via the uplink resources.

Figure 3:
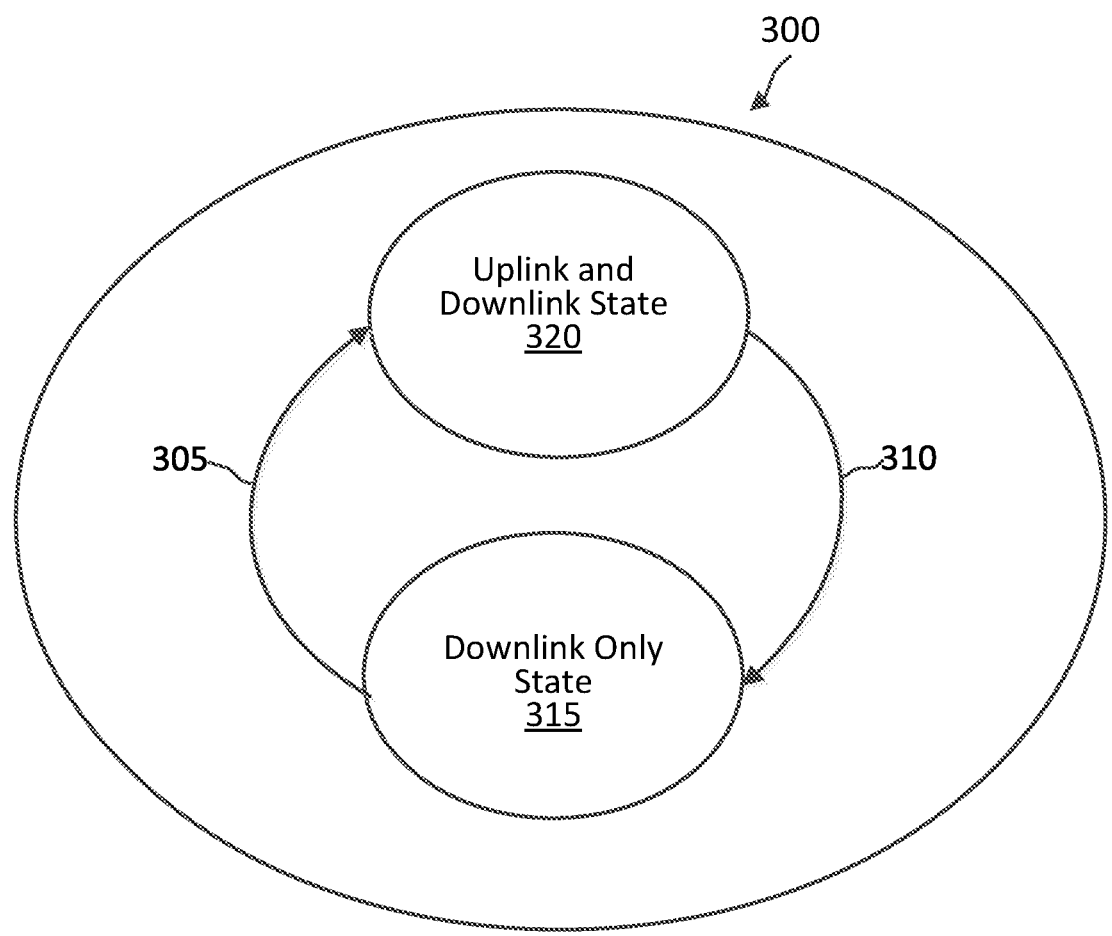
FIG. 3 illustrates power saving states associated with a UE according to some aspects of the present disclosure.

FIG. 3 illustrates power saving states associated with a UE according to some aspects of the present disclosure. In some examples, the state configuration 300 may represent a configuration of power states for a UE 115, which may be an example of a UE 115 as described with reference to FIGS. 1 and 2. The state configuration 300 illustrates an example configuration of a downlink only state 315 and an uplink and downlink state 320.

Although the state configuration 300 illustrates a configuration of a downlink only state 315 and an uplink and downlink state 320, it is to be understood that a UE 115 may be configured to cycle between any quantity of power states. For example, a UE 115 may be configured with a downlink only state, an uplink only state, and/or an uplink and downlink state.

In the example of FIG. 3, communications between the UE 115 and a base station 105 may follow a somewhat regular or periodic pattern, and may occur relatively frequently. For example, the UE 115 (e.g., an XR device) may support one or more applications (e.g., cloud gaming applications, virtual reality (VR) split rendering applications, augmented reality (AR) split computation applications, or some other applications, or any combination thereof) that may be associated with relatively frequent (e.g., low latency) downlink traffic that has a regular or periodic pattern. In some examples, the UE 115 may share computational or rendering processes with a cloud (e.g., an edge cloud), which may result in the frequent downlink transmission (e.g., frequent downlink traffic with relatively small data packet size). Accordingly, it may be beneficial for the UE 115 to reduce power consumption while continuing frequent downlink transmission.

As described herein, the UE 115 may be configured to cycle between the downlink only state 315 and the uplink and downlink state 320 that may be associated with more power consumption by the UE 115 than the downlink only state 315. The configured power states may provide for the UE 115 to perform relatively frequent downlink transmission to support such applications while reducing power consumption.

The UE 115 may perform the transition 310 from the uplink and downlink state 320 to the downlink only state 315 according to a downlink only indicator, a DCI message, a timer parameter, an inactivity timer parameter, or both. By transitioning between power states periodically, the UE 115 may reduce overhead and increase control channel capacity as compared with transitioning based on control signaling received from the network unit.

In some examples, the UE 115 may perform transition 305, transition 310, or both, in response to receiving a downlink only indicator via DCI. If the UE 115 is configured with the duty cycle parameters, the DCI may indicate an earlier or later transition 305 or transition 310 than the duty cycle parameters. For example, a base station 105 may transmit DCI to the UE 115 to indicate the UE 115 should perform the transition 305 earlier than the configured duty cycle.

In some examples, the downlink only state 315, the uplink and downlink state 320, or both, may be configured for the UE 115 (e.g., pre-defined or pre-configured). Additionally or alternatively, the UE 115 may operate in the downlink only state 315, the uplink and downlink state 320, or both, based on a RRC configuration. For example, a network unit 105 may transmit a RRC configuration to the UE 115 to indicate the power states. To configure the UE 115 to operate in the downlink only state 315 and communicate uplink data according to an uplink configured grant (e.g., an uplink configured grant in response to a scheduling request), one or more uplink configured grant parameters may be set in the RRC configuration.

Accordingly, the downlink only state 315 and the uplink and downlink state 320 may be configured such that a UE 115 may reduce power consumption while supporting applications associated with relatively frequent or periodic uplink transmission.

Figure 4:
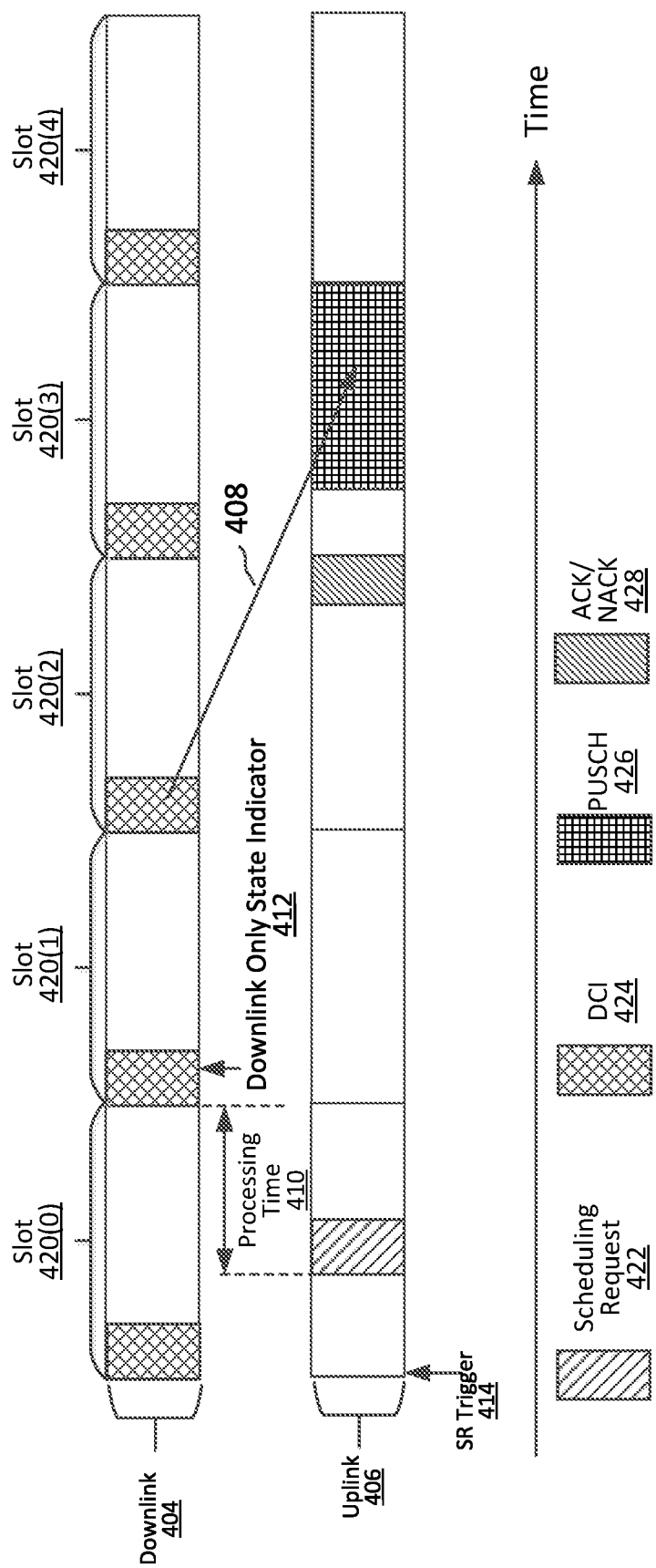
FIG. 4 illustrates resources associated with a downlink only state according to some aspects of the present disclosure.

FIG. 4 illustrates resources associated with a downlink only state according to some aspects of the present disclosure. In FIG. 4, the horizontal axis may represent time in some arbitrary units. The downlink 404 timeline may indicate transmission(s) by a network unit. The uplink timeline 406 may represent transmission(s) by a UE. In some aspects, a user equipment (UE) (e.g., the UE 115, the UE 600) may transmit a scheduling request 422 for uplink resources to a network unit (e.g., the network unit 700, the BS 105, the RU 240, the DU 230, and/or the CU 210). In this regard, the UE may transmit the scheduling request (SR) 422 via UCI, a PUCCH communication, a PUSCH communication 426, a MAC-CE communication, or other suitable communication. The scheduling request 422 may be for time/frequency resources in which the UE may transmit uplink communications (e.g., a PUSCH 426). In some aspects, the UE may transmit the scheduling request 422 in response to receiving one or more TBs in a transmit buffer of the UE. For example, a physical (PHY) layer of the UE may receive the TB(s) in the buffer from a medium access control (MAC) layer of the UE at a time corresponding to SR trigger 414. In some aspects, the UE may transmit the scheduling request 422 based on a latency budget associated with the TB(s) and/or a quality of service (QOS) associated with the TB(s). For example, the data associated with the TB(s) in the transmit buffer may have a latency budget (e.g. a time period in which the TB(s) need to be received by the network unit). The UE may transmit the scheduling request 422 based on the latency budget satisfying a threshold (e.g., less than or equal to the threshold). In some aspects, the UE may transmit the scheduling request 422 based on a size of the TB(s) and/or a number of the TB(s) to be transmitted. For example, the UE may transmit the scheduling request 422 based on the size of the TB(s) (e.g., the amount of data) to be transmitted satisfying a threshold (e.g., greater than or equal to the TB size threshold). Additionally or alternatively, the UE may transmit the scheduling request 422 based on the number of the TB(s) to be transmitted satisfying a threshold (e.g., greater than or equal to the number of TB(s) threshold).

In some aspects, the UE may receive an indicator from the network unit to enter the downlink only state. In this regard, the UE may receive the indicator via DCI 424, a PDCCH communication, a PDSCH communication, a MAC-CE communication, or other suitable communication. For example, the UE may receive DCI 424 including downlink only state indicator 412. The downlink only state may be a state in which the UE reduces power consumption by powering down and/or temporarily disabling certain components of the UE. For example, in a downlink only state the UE may power down amplifier(s), phase shifter(s), D/A converter(s), memory(s), processor(s), and/or other components in order to reduce power consumption and extend battery charge. In some aspects, the UE may receive the downlink only state indicator 412 after transmitting the scheduling request 422. For example, the UE may transmit the scheduling request 422 in slot 420(0) and receive the downlink only indicator 412 via DCI 424 in slot 420(1). Slot 420(1) may be the next slot after slot 420(0). For example, slot 420(1) may immediately follow slot 420(0) in time. Slot 420(1) may be contiguous in time with slot 420(0). The network unit may transmit the downlink only indicator 412 to the UE after receiving the scheduling request 422 based on the network unit not having enough processing time 410 to process the scheduling request 422. In some aspects, when the network unit has sufficient processing time 410 to process the scheduling request 422, the network unit may refrain from transmitting the downlink only state indicator 412. When the UE transmits scheduling request 422 in order to transmit TB(s) (e.g., low latency TB(s)), but receives a downlink only state indicator 412, the UE may ignore the downlink only state indicator 412 and refrain from entering the downlink only state.

In some aspects, the UE may transmit a request to the network unit to enter the downlink only state. In this regard, the UE may transmit the downlink only state request via UCI, a PUCCH communication, a PUSCH communication 426, a MAC-CE communication, or other suitable communication. The network unit may respond to (e.g., acknowledge) the downlink only state request by transmitting the downlink only indicator 412 to the UE. The UE may transmit the downlink only request in order to reduce power consumption by powering down component(s) in the uplink transmit chain. After transmitting the request to enter the downlink only state, the UE may receive TB(s) in its transmit buffer from the MAC layer of the UE. The UE may then transmit the scheduling request 422 to the network unit for time/frequency resources in response to receiving the TB(s) in the transmit buffer.

In some aspects, the scheduling request 422 may indicate to the network unit that the UE has TB(s) for transmission and will not enter the downlink only state. Additionally or alternatively, the UE may transmit a request to not enter the downlink only state. In this regard, the UE may transmit the request to not enter the downlink only state request via UCI, a PUCCH communication, a PUSCH communication 426, a MAC-CE communication, or other suitable communication. In response, the network unit may refrain from transmitting the downlink only state indicator 412. For example, when the network unit processes the scheduling request 422 before transmitting the downlink only indicator 412, the network unit may refrain from transmitting the downlink only indicator 412. In some aspects, when the network unit does not have enough processing time 410 to cancel the downlink only state indicator 412, the network unit may respond to the scheduling request 422 by transmitting an indicator of the uplink resources in a subsequent DCI. For example, the UE may transmit the scheduling request 422 in slot 420(0), the network unit may transmit the downlink only state indicator in slot 420(1), the network unit may then transmit the indicator of the uplink resources via DCI in slot 420(2) as indicated by arrow 408.

In some aspects, the UE may monitor for DCI 424 from the network unit. The UE may monitor for DCI 424 that includes an indicator of the uplink resources requested by the scheduling request 422 transmitted by the UE. For example, the UE may begin to monitor for the DCI 424 including the uplink resources in slot 420(1) following the transmission of the scheduling request 422 in slot 420(0). Additionally or alternatively, the UE may delay for a time period before monitoring for the DCI 424 including the uplink resources. For example, the UE may transmit the scheduling request 422 in slot 420(0), receive the downlink only state indicator 412 in slot 420(1), enter the downlink only state (e.g., low power state), and then wake up from the low power state to monitor for the DCI 424 that indicates the uplink resources. The UE may enter the downlink only state and delay monitoring for the DCI 424 for a period of time indicated as a number of slots 420, a number of symbols, and/or a number of milliseconds. In some aspects, the UE may indicate the delay period to the network unit. For example, the UE may indicate the delay period to the network unit in the scheduling request 422 transmitted to the network unit at action 810. In some aspects, the delay period may be preconfigured. Additionally or alternatively, the delay period may be indicated by the network unit to the UE. For example, the network unit may indicate the delay period to the UE in the downlink only indicator 412 transmitted to the UE in slot 420(1).

In some aspects, the UE may transmit one or more transport blocks (TBs) to the network unit via PUSCH 426. In this regard, the UE may transmit the TB(s) to the network unit using the uplink resources received via the DCI 424 in slot 420(2). The UE may transmit the TB(s) via PUSCH 426 to the network unit after the receiving the indicator indicating the UE to enter the downlink only state by ignoring the downlink only state indicator 412.

In some aspects, the UE may transmit an acknowledgement (ACK)/negative acknowledgement (NACK) 428 to the network unit after receiving the downlink only state indicator 412 in slot 420(1) from the network unit. For example, the UE may receive a downlink communication (e.g., a PDSCH communication, a PDCCH communication, or other suitable communication) from the network unit prior to transmitting the scheduling request in slot 420(0). The UE may receive the downlink only state indicator 412, ignore the downlink only state indicator 412 (e.g., not enter the downlink only state) and transmit the ACK/NACK 428 associated with the prior downlink communication to the network unit in slot 420(2).

Figure 5:
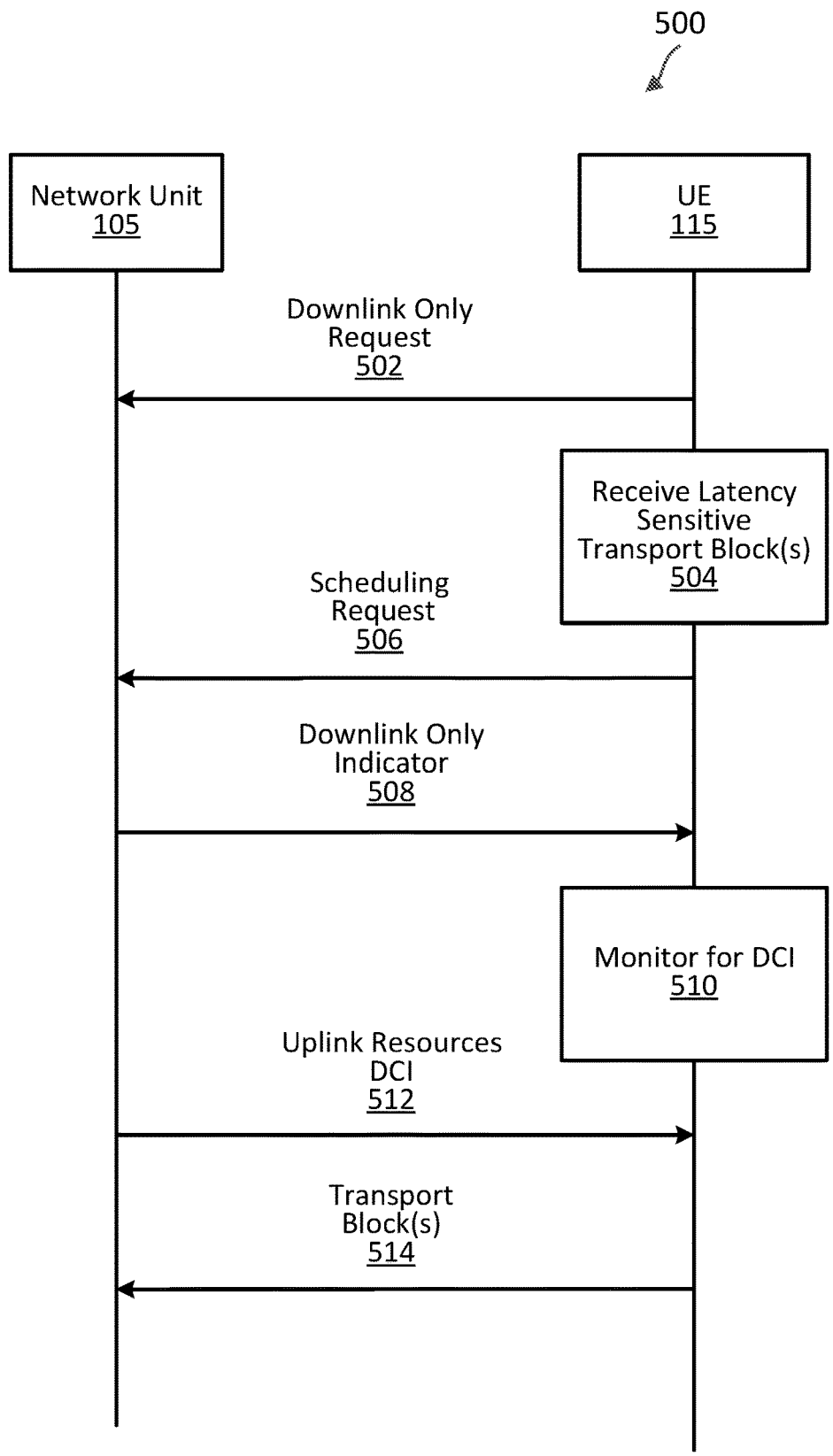
FIG. 5 is a signal flow diagram of a communication method according to some aspects of the present disclosure.

FIG. 5 is a flow diagram of a communication method 500 according to some aspects of the present disclosure. Aspects of the method 500 may be executed by a computing device (e.g., a processor, processing circuit, and/or other suitable component) of a wireless communication device or other suitable means for performing the actions. For example, a wireless communication device, such as the UE 115 or the UE 600 may utilize one or more components, such as the processor 602, the memory 604, the downlink only module 608, the transceiver 610, the modem 612, and the one or more antennas 616, to execute aspects of method 500. The method 500 may employ similar mechanisms as in the networks 100 and 200 and the aspects and actions described with respect to FIGS. 3-4. For example, a wireless communication device, such as the network unit 105 may utilize one or more components, such as the processor 702, the memory 704, the downlink only module 708, the transceiver 710, the modem 712, and the one or more antennas 716, to execute aspects of method 500. As illustrated, the method 500 includes a number of enumerated actions, but the method 500 may include additional actions before, after, and in between the enumerated actions. In some aspects, one or more of the enumerated actions may be omitted or performed in a different order.

At action 502, the UE 115 may transmit a request to the network unit 105 for the UE to enter a downlink only state. In this regard, the UE 115 may transmit the downlink only state request via UCI, a PUCCH communication, a PUSCH communication, a MAC-CE communication, or other suitable communication. The network unit 105 may respond to (e.g., acknowledge) the downlink only state request by transmitting the downlink only indicator to the UE 115. The UE 115 may transmit the downlink only request in order to reduce power consumption by powering down component(s) in the uplink transmit chain.

At action 504, the UE 115 may receive TB(s) (e.g., latency sensitive TB(s)) in a transmit buffer of the UE 115. In some aspects, after transmitting the request to enter the downlink only state at action 502, the UE 115 may receive TB(s) in its transmit buffer from the MAC layer of the UE 115.

At action 506, the UE 115 may transmit a scheduling request to the network unit 105 for time/frequency resources in response to receiving the TB(s) in the transmit buffer at action 504. In this regard, the UE 115 may transmit the scheduling request via UCI, a PUCCH communication, a PUSCH communication, a MAC-CE communication, or other suitable communication. The scheduling request may be for time/frequency resources in which the UE 115 may transmit uplink communications. In some aspects, the UE 115 may transmit the scheduling request in response to receiving one or more TBs in a transmit buffer of the UE at action 504. For example, a physical (PHY) layer of the UE 115 may receive the TB(s) in the buffer from a medium access control (MAC) layer of the UE 115. In some aspects, the UE 115 may transmit the scheduling request based on a latency budget associated with the TB(s) and/or a quality of service (QOS) associated with the TB(s). For example, the data associated with the TB(s) in the transmit buffer may have a latency budget (e.g. a time period in which the TB(s) need to be received by the network unit 105). The UE 115 may transmit the scheduling request based on the latency budget satisfying a threshold (e.g., less than or equal to the threshold). In some aspects, the UE 115 may transmit the scheduling request based on a size of the TB(s) and/or a number of the TB(s) to be transmitted. For example, the UE 115 may transmit the scheduling request based on the size of the TB(s) (e.g., the amount of data) to be transmitted satisfying a threshold (e.g., greater than or equal to the number of TB(s) threshold). Additionally or alternatively, the UE 115 may transmit the scheduling request based on the number of the TB(s) to be transmitted satisfying a threshold (e.g., greater than or equal to the size threshold).

At action 508, the network unit 105 may transmit a downlink only indicator to the UE 115. In this regard, the network unit 105 may transmit the indicator via DCI, a PDCCH communication, a PDSCH communication, a MAC-CE communication, or other suitable communication.

The downlink only state may be a state in which the UE 115 reduces power consumption by powering down and/or temporarily disabling certain components of the UE 115. For example, in a downlink only state the UE 115 may power down amplifier(s), phase shifter(s), D/A converter(s), memory(s), processor(s), and/or other components in order to reduce power consumption and extend battery charge. In some aspects, the UE 115 may receive the downlink only state indicator after transmitting the scheduling request at action 506. For example, the UE 115 may transmit the scheduling request in a first slot and receive the downlink only indicator (e.g., receive via DCI) in a second slot. The second slot may be the next slot after the first slot. For example, the second slot may immediately follow the first slot in time. The second slot may be contiguous in time with the first slot. The network unit 105 may transmit the downlink only indicator to the UE 115 after receiving the scheduling request based on the network unit 105 not having enough time to process the scheduling request. When the UE 115 transmits a scheduling request in order to transmit TB(s) (e.g., low latency TB(s)), but receives a downlink only state indicator, the UE 115 may ignore the downlink only state indicator and refrain from entering the downlink only state.

At action 510, the UE 115 may monitor for DCI from the network unit 105. The UE 115 may monitor for DCI that includes an indicator of the uplink resources requested by the scheduling request transmitted by the UE at action 506. For example, the UE 115 may begin to monitor for the DCI including the uplink resources in the next slot following the transmission of the scheduling request. Additionally or alternatively, the UE 115 may delay for a time period before monitoring for the DCI including the uplink resources. For example, the UE 115 may transmit the scheduling request, receive the downlink only state indicator, enter the downlink only state (e.g., low power state), and then wake up from the low power state to monitor for the DCI that indicates the uplink resources. The UE 115 may enter the downlink only state and delay monitoring for the DCI for a period of time indicated as a number of slots, a number of symbols, and/or a number of milliseconds. In some aspects, the UE 115 may indicate the delay period to the network unit. For example, the UE 115 may indicate the delay period to the network unit 105 in the scheduling request transmitted to the network unit at action 506. In some aspects, the delay period may be preconfigured. Additionally or alternatively, the delay period may be indicated by the network unit 105 to the UE 115. For example, the network unit 105 may indicate the delay period to the UE 115 in the downlink only indicator transmitted to the UE at action 508.

At action 512, the network unit 105 may transmit an indicator (e.g., a configured grant) to the UE 115 for time/frequency resources in which the UE may transmit uplink communications.

At action 514, the UE 115 may transmit one or more transport blocks (TBs) to the network unit 105. In this regard, the UE 115 may transmit the TB(s) to the network unit 105 using the uplink resources received via the DCI at action 512. The UE 115 may transmit the TB(s) to the network unit 105 after the receiving the indicator indicating the UE to enter the downlink only state by ignoring the downlink only state indicator.

Figure 6:
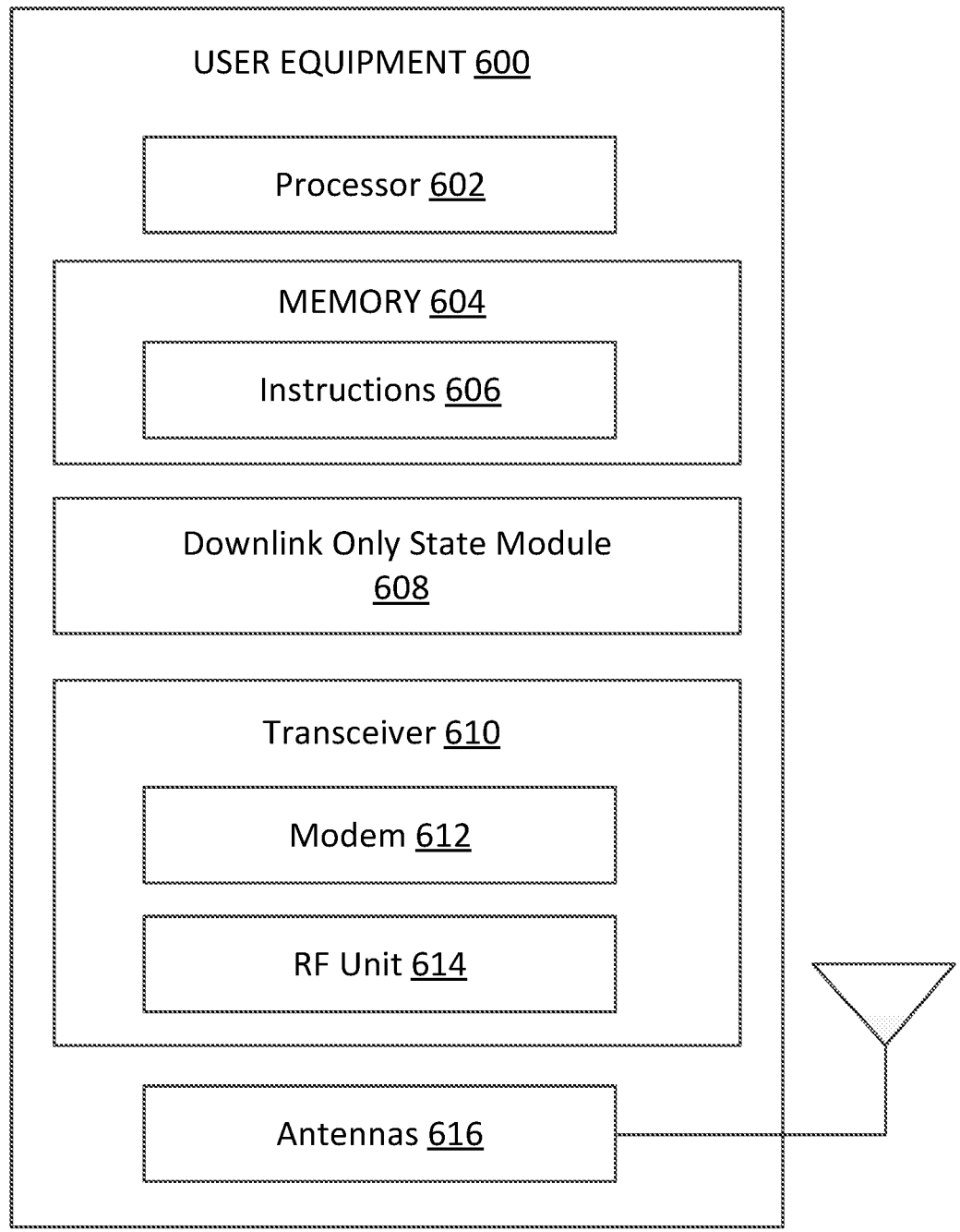
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100, or 200 as discussed above. As shown, the UE 600 may include a processor 602, a memory 604, a downlink only module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 3-5. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The downlink only module 608 may be implemented via hardware, software, or combinations thereof. For example, the downlink only module 608 may be implemented as a processor, circuit, and/or instructions 606 stored in the memory 604 and executed by the processor 602. In some aspects, the downlink only module 608 may implement the aspects of FIGS. 3-5. For example, the downlink only module 608 may UE 115 may transmit a scheduling request associated with uplink resources to a BS 105. The UE 115 may receive, from the network unit, an indicator indicating the UE 115 to enter a downlink only state. The UE 115 may monitor for first downlink control information (DCI) without entering the downlink only state. The DCI may comprise an indicator of the uplink resources. The UE 115 may transmit, to the network unit after the receiving the indicator indicating the UE 115 to enter the downlink only state, one or more transport blocks (TBs) via the uplink resources.

As shown, the transceiver 610 may include the modem subsystem 612 and the RF unit 614. The transceiver 610 may be configured to communicate bi-directionally with other devices, such as the BSs 105 and/or the UEs 115. The modem subsystem 612 may be configured to modulate and/or encode the data from the memory 604 and the according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 may include multiple transceivers 610 implementing different RATs (e.g., NR and LTE). In some instances, the UE 600 may include a single transceiver 610 implementing multiple RATs (e.g., NR and LTE). In some instances, the transceiver 610 may include various components, where different combinations of components may implement RATs.

Figure 7:
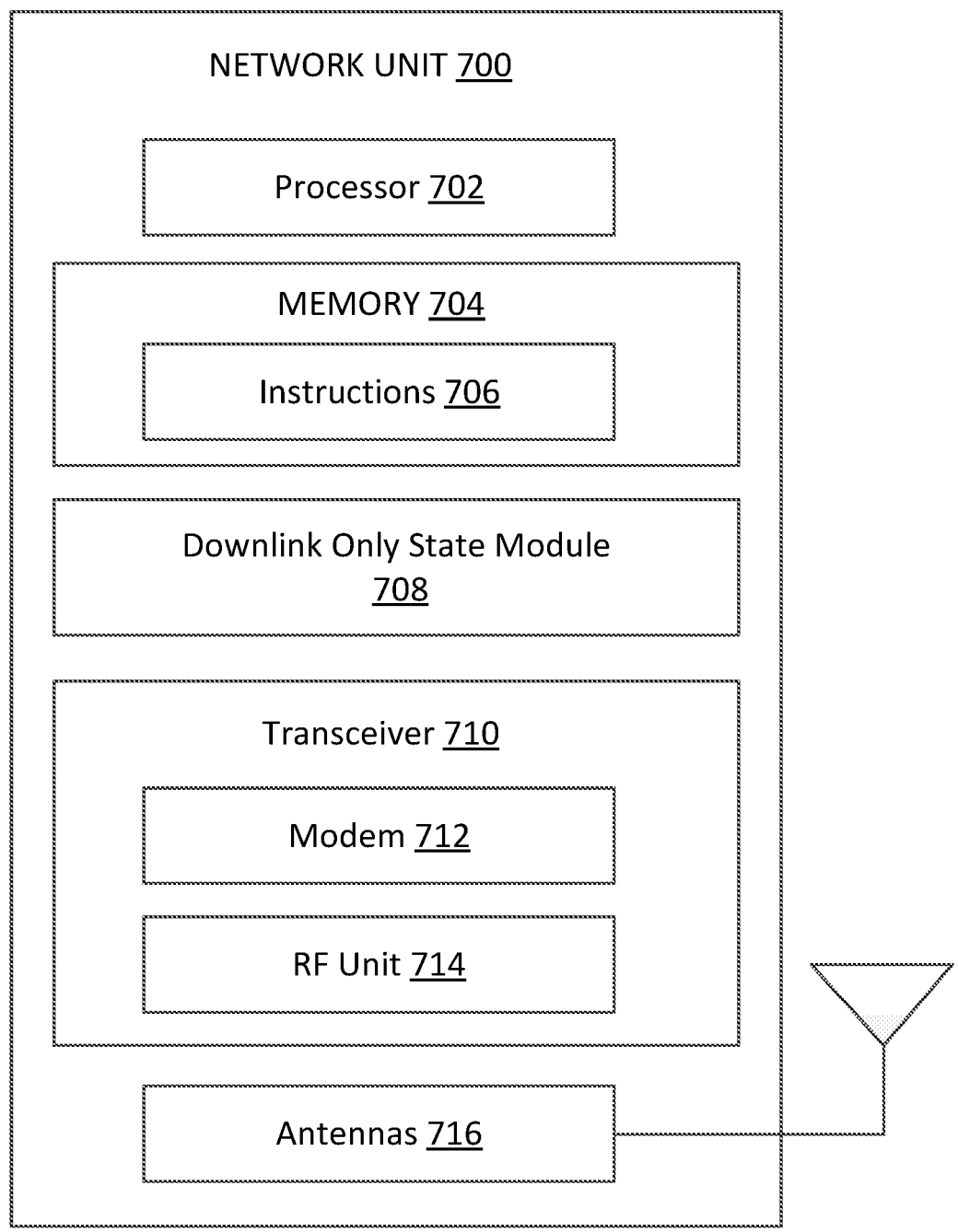
FIG. 7 is a block diagram of an exemplary network unit according to some aspects of the present disclosure.

FIG. 7 is a block diagram of an exemplary network unit 700 according to some aspects of the present disclosure. The network unit 700 may be the BS 105, the CU 210, the DU 230, or the RU 240, as discussed above. As shown, the network unit 700 may include a processor 702, a memory 704, a downlink only module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-5. Instructions 706 may also be referred to as code, which may be interpreted broadly to include any type of computer-readable statement(s).

The downlink only module 708 may be implemented via hardware, software, or combinations thereof. For example, the downlink only module 708 may be implemented as a processor, circuit, and/or instructions 706 stored in the memory 704 and executed by the processor 702.

In some aspects, the downlink only module 708 may implement the aspects of FIGS. 3-5. For example, the downlink only module 708 may receive, from a user equipment (UE), a scheduling request associated with uplink resources. The downlink only module 708 may transmit, to the UE, an indicator indicating the UE to enter a downlink only state. The downlink only module 708 may transmit, to the UE, first downlink control information (DCI). The DCI may comprise an indicator of the uplink resources. The downlink only module 708 may receive, from the UE after the transmitting the indicator indicating the UE to enter the downlink only state, one or more transport blocks (TBs) via the uplink resources.

Additionally or alternatively, the downlink only module 708 may be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 may be configured to communicate bi-directionally with other devices, such as the UEs 115 and/or UE 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the network unit 700 may include multiple transceivers 710 implementing different RATs (e.g., NR and LTE). In some instances, the network unit 700 may include a single transceiver 710 implementing multiple RATs (e.g., NR and LTE). In some instances, the transceiver 710 may include various components, where different combinations of components may implement RATs.

Figure 8:
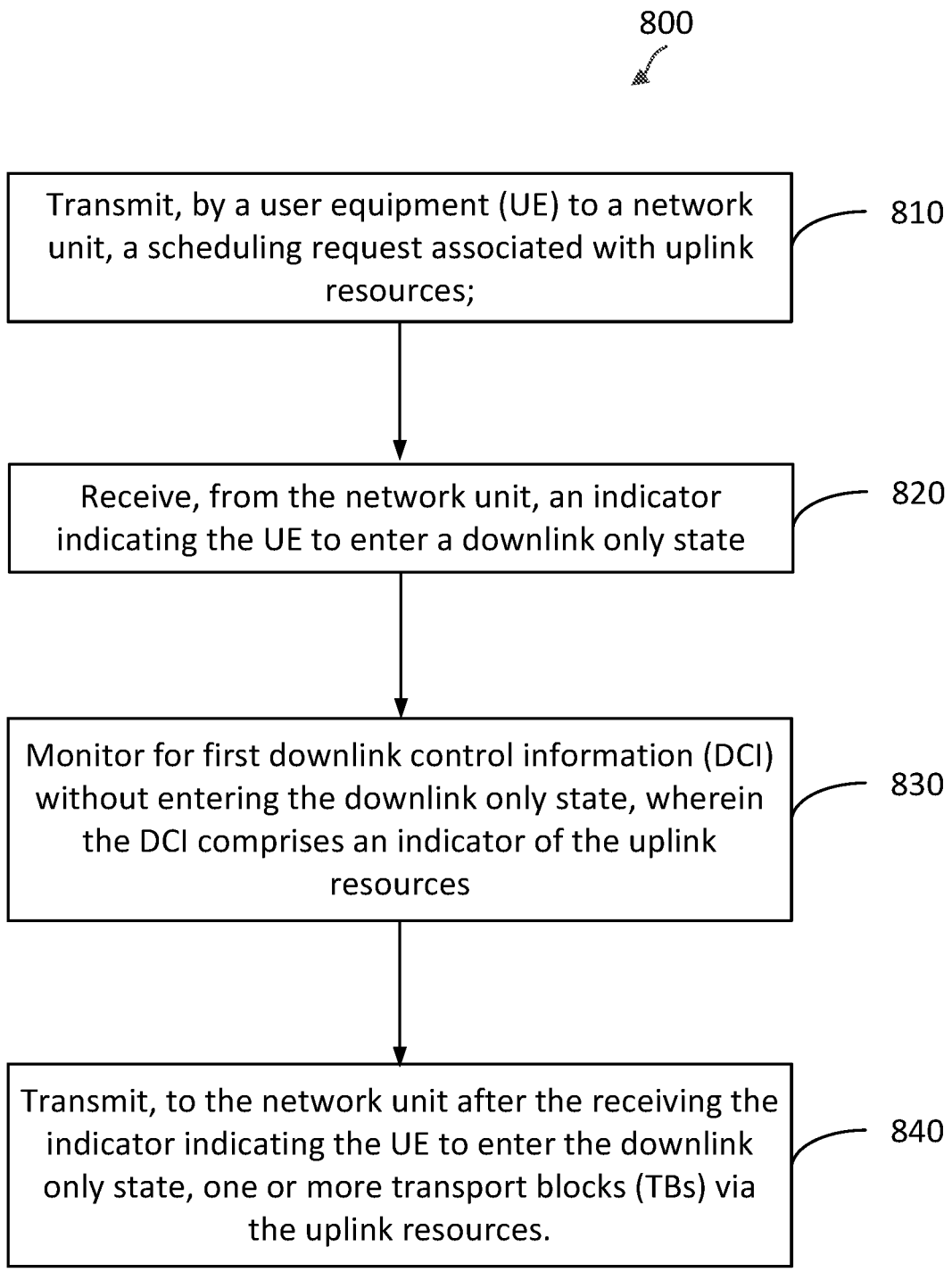
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the downlink only state module 608, the transceiver 610, the modem 612, and the one or more antennas 616, to execute aspects of method 800. The method 800 may employ similar mechanisms as in the networks 100 and 200 and the aspects and actions described with respect to FIGS. 3-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a user equipment (UE) (e.g., the UE 115, the UE 600) transmitting a scheduling request for uplink resources to a network unit (e.g., the network unit 700, the BS 105, the RU 240, the DU 230, and/or the CU 210). In this regard, the UE may transmit the scheduling request via UCI, a PUCCH communication, a PUSCH communication, a MAC-CE communication, or other suitable communication. The scheduling request may be for time/frequency resources in which the UE may transmit uplink communications. In some aspects, the UE may transmit the scheduling request in response to receiving one or more TBs in a transmit buffer of the UE. For example, a physical (PHY) layer of the UE may receive the TB(s) in the buffer from a medium access control (MAC) layer of the UE. In some aspects, the UE may transmit the scheduling request based on a latency budget associated with the TB(s) and/or a quality of service (QOS) associated with the TB(s). For example, the data associated with the TB(s) in the transmit buffer may have a latency budget (e.g. a time period in which the TB(s) need to be received by the network unit). The UE may transmit the scheduling request based on the latency budget satisfying a threshold (e.g., less than or equal to the threshold). In some aspects, the UE may transmit the scheduling request based on a size of the TB(s) and/or a number of the TB(s) to be transmitted. For example, the UE may transmit the scheduling request based on the size of the TB(s) (e.g., the amount of data) to be transmitted satisfying a threshold (e.g., greater than or equal to the size threshold). Additionally or alternatively, the UE may transmit the scheduling request based on the number of the TB(s) to be transmitted satisfying a threshold (e.g., greater than or equal to the number of TB(s) threshold).

At action 820, the method 800 includes the UE receiving an indicator from the network unit to enter the downlink only state. In this regard, the UE may receive the indicator via DCI, a PDCCH communication, a PDSCH communication, a MAC-CE communication, or other suitable communication. The downlink only state may be a state in which the UE reduces power consumption by powering down and/or temporarily disabling certain components of the UE. For example, in a downlink only state the UE may power down amplifier(s), phase shifter(s), D/A converter(s), memory(s), processor(s), and/or other components in order to reduce power consumption and extend battery charge. In some aspects, the UE may receive the downlink only state indicator after transmitting the scheduling request at action 810. For example, the UE may transmit the scheduling request in a first slot and receive the downlink only indicator (e.g., receive via DCI) in a second slot. The second slot may be the next slot after the first slot. For example, the second slot may immediately follow the first slot in time. The second slot may be contiguous in time with the first slot. The network unit may transmit the downlink only indicator to the UE after receiving the scheduling request based on the network unit not having enough time to process the scheduling request. In some aspects, when the network unit has sufficient time to process the scheduling request, the network unit may refrain from transmitting the downlink only state indicator. When the UE transmits a scheduling request in order to transmit TB(s) (e.g., low latency TB(s)), but receives a downlink only state indicator, the UE may ignore the downlink only state indicator and refrain from entering the downlink only state.

In some aspects, the UE may transmit a request to the network unit to enter the downlink only state. In this regard, the UE may transmit the downlink only state request via UCI, a PUCCH communication, a PUSCH communication, a MAC-CE communication, or other suitable communication. The network unit may respond to (e.g., acknowledge) the downlink only state request by transmitting the downlink only indicator to the UE. The UE may transmit the downlink only request in order to reduce power consumption by powering down component(s) in the uplink transmit chain. After transmitting the request to enter the downlink only state, the UE may receive TB(s) in its transmit buffer from the MAC layer of the UE. The UE may then transmit the scheduling request to the network unit for time/frequency resources in response to receiving the TB(s) in the transmit buffer.

In some aspects, the scheduling request may indicate to the network unit that the UE has TB(s) for transmission and will not enter the downlink only state. Additionally or alternatively, the UE may transmit a request to not enter the downlink only state. In this regard, the UE may transmit the request to not enter the downlink only state request via UCI, a PUCCH communication, a PUSCH communication, a MAC-CE communication, or other suitable communication. In response, the network unit may refrain from transmitting the downlink only state indicator. For example, when the network unit processes the scheduling request before transmitting the downlink only indicator, the network unit may refrain from transmitting the downlink only indicator. In some aspects, when the network unit does not have enough processing time to cancel the downlink only state indicator, the network unit may respond to the scheduling request by transmitting an indicator of the uplink resources in a subsequent DCI. For example, the UE may transmit the scheduling request in slot i, the network unit may transmit the downlink only state indicator in slot i+1, the network unit may then transmit the indicator of the uplink resources via DCI in slot i+x, where x is an integer greater than 1.

At action 830, the method 800 includes the UE monitoring for DCI from the network unit. The UE may monitor for DCI that includes an indicator of the uplink resources requested by the scheduling request transmitted by the UE at action 810. For example, the UE may begin to monitor for the DCI including the uplink resources in the next slot following the transmission of the scheduling request. Additionally or alternatively, the UE may delay for a time period before monitoring for the DCI including the uplink resources. For example, the UE may transmit the scheduling request, receive the downlink only state indicator, enter the downlink only state (e.g., low power state), and then wake up from the low power state to monitor for the DCI that indicates the uplink resources. The UE may enter the downlink only state and delay monitoring for the DCI for a period of time indicated as a number of slots, a number of symbols, and/or a number of milliseconds. In some aspects, the UE may indicate the delay period to the network unit. For example, the UE may indicate the delay period to the network unit in the scheduling request transmitted to the network unit at action 810. In some aspects, the delay period may be preconfigured. Additionally or alternatively, the delay period may be indicated by the network unit to the UE.

For example, the network unit may indicate the delay period to the UE in the downlink only indicator transmitted to the UE at action 820.

At action 840, the method 800 includes the UE transmitting one or more transport blocks (TBs) to the network unit. In this regard, the UE may transmit the TB(s) to the network unit using the uplink resources received via the DCI monitoring at action 830. The UE may transmit the TB(s) to the network unit after the receiving the indicator indicating the UE to enter the downlink only state by ignoring the downlink only state indicator.

In some aspects, the UE may transmit an acknowledgement (ACK)/negative acknowledgement (NACK) to the network unit after receiving the downlink only state indicator from the network unit at action 820. For example, the UE may receive a downlink communication (e.g., a PDSCH communication, a PDCCH communication, or other suitable communication) from the network unit prior to transmitting the scheduling request at action 810. The UE may receive the downlink only state indicator, ignore the downlink only state indicator (e.g., not enter the downlink only state) and transmit the ACK/NACK associated with the prior downlink communication to the network unit.

Figure 9:
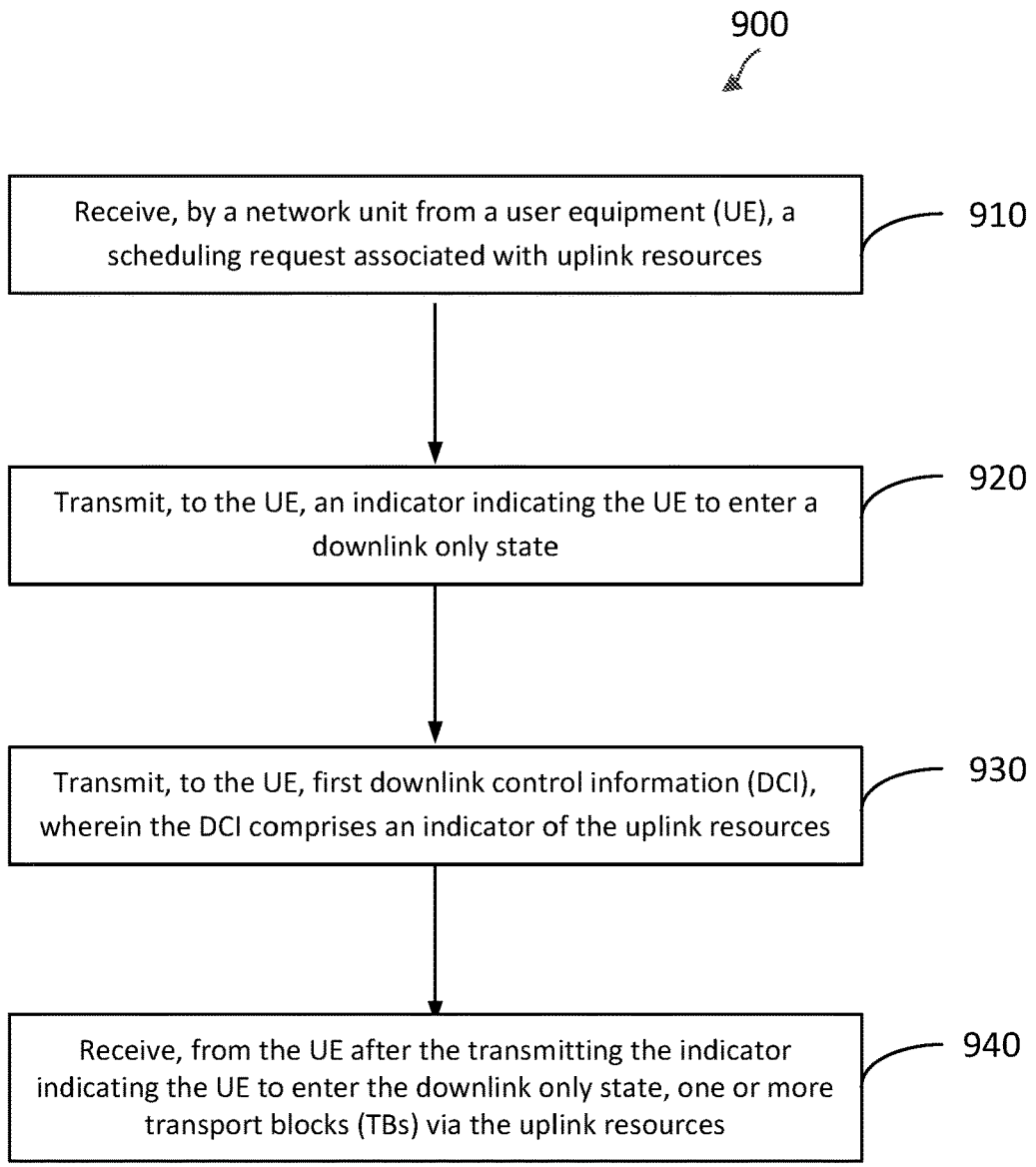
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the network unit 700, the BS 105, the RU 240, the DU 230, and/or the CU 210, may utilize one or more components, such as the processor 702, the memory 704, the downlink only state module 708, the transceiver 710, the modem 712, and the one or more antennas 716, to execute aspects of method 900. The method 900 may employ similar mechanisms as in the networks 100 and 200 and the aspects and actions described with respect to FIGS. 3-5. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a network unit (e.g., the network unit 700, the BS 105, the RU 240, the DU 230, and/or the CU 210) receiving a scheduling request for uplink resources from a user equipment (e.g., the UE 115, the UE 600). In this regard, the network unit may receive the scheduling request via UCI, a PUCCH communication, a PUSCH communication, a MAC-CE communication, or other suitable communication. The scheduling request may be for time/frequency resources in which the UE may transmit uplink communications to the network unit. In some aspects, the network unit may receive the scheduling request in response to the UE receiving one or more TBs in a transmit buffer of the UE. For example, a physical (PHY) layer of the UE may receive the TB(s) in the buffer from a medium access control (MAC) layer of the UE. In some aspects, the network unit may receive the scheduling request based on a latency budget associated with the TB(s) and/or a quality of service (QOS) associated with the TB(s). For example, the data associated with the TB(s) in the transmit buffer may have a latency budget (e.g. a time period in which the TB(s) need to be received by the network unit). The network unit may receive the scheduling request based on the latency budget satisfying a threshold (e.g., less than or equal to the threshold). In some aspects, the network unit may receive the scheduling request based on a size of the TB(s) and/or a number of the TB(s) to be transmitted. For example, the network unit may receive the scheduling request based on the size of the TB(s) (e.g., the amount of data) satisfying a threshold (e.g., greater than or equal to the size threshold). Additionally or alternatively, the network unit may receive the scheduling request based on the number of the TB(s) satisfying a threshold (e.g., greater than or equal to the number of TB(s) threshold).

At action 920, the method 900 includes the network unit transmitting an indicator to the UE to enter the downlink only state. In this regard, the network unit may transmit the indicator via DCI, a PDCCH communication, a PDSCH communication, a MAC-CE communication, or other suitable communication. The downlink only state may be a state in which the UE reduces power consumption by powering down and/or temporarily disabling certain components of the UE. For example, in a downlink only state the UE may power down amplifier(s), phase shifter(s), D/A converter(s), memory(s), processor(s), and/or other components in order to reduce power consumption and extend battery charge. In some aspects, the network unit may transmit the downlink only state indicator after receiving the scheduling request at action 910. For example, the network unit may receive the scheduling request in a first slot and transmit the downlink only indicator (e.g., transmit the indicator via DCI) in a second slot. The second slot may be the next slot after the first slot. For example, the second slot may immediately follow the first slot in time. The second slot may be contiguous in time with the first slot. The network unit may transmit the downlink only indicator to the UE after receiving the scheduling request based on the network unit not having enough time to process the scheduling request. In some aspects, when the network unit has sufficient time to process the scheduling request, the network unit may refrain from transmitting the downlink only state indicator. When the UE transmits a scheduling request in order to transmit TB(s) (e.g., low latency TB(s)), but receives a downlink only state indicator, the UE may ignore the downlink only state indicator and refrain from entering the downlink only state.

In some aspects, the network unit may receive a request from the UE to enter the downlink only state. In this regard, the network unit may receive the downlink only state request via UCI, a PUCCH communication, a PUSCH communication, a MAC-CE communication, or other suitable communication. The network unit may respond to (e.g., acknowledge) the downlink only state request by transmitting the downlink only indicator to the UE. The UE may transmit the downlink only request in order to reduce power consumption by powering down component(s) in the uplink transmit chain. After transmitting the request to enter the downlink only state, the UE may receive TB(s) in its transmit buffer from the MAC layer of the UE. The UE may then transmit the scheduling request to the network unit for time/frequency resources in response to receiving the TB(s) in the transmit buffer.

In some aspects, the scheduling request may indicate to the network unit that the UE has TB(s) for transmission and will not enter the downlink only state. Additionally or alternatively, the network unit may receive a request from the UE to not enter the downlink only state. In this regard, the network unit may receive the request to not enter the downlink only state request via UCI, a PUCCH communication, a PUSCH communication, a MAC-CE communication, or other suitable communication. In response, the network unit may refrain from transmitting the downlink only state indicator. For example, when the network unit processes the scheduling request before transmitting the downlink only indicator, the network unit may refrain from transmitting the downlink only indicator. In some aspects, when the network unit does not have enough processing time to cancel the downlink only state indicator, the network unit may respond to the scheduling request by transmitting an indicator of the uplink resources in a subsequent DCI. For example, the UE may transmit the scheduling request in slot i, the network unit may transmit the downlink only state indicator in slot i+1, the network unit may then transmit the indicator of the uplink resources via DCI in slot i+x, where x is an integer greater than 1.

At action 930, the method 900 includes the network unit transmitting first DCI to the UE. The DCI may include an indicator of the uplink resources requested by the scheduling request received from the UE at action 910. In some aspects, the network unit may transmit the DCI including the uplink resources in the next slot following the transmission of the scheduling request. Additionally or alternatively, the network unit may delay for a time period before transmitting the DCI including the uplink resources. For example, the UE may transmit the scheduling request, receive the downlink only state indicator, enter the downlink only state (e.g., low power state), and then wake up from the low power state to monitor for the DCI that indicates the uplink resources. The UE may enter the downlink only state and delay monitoring for the DCI for a period of time indicated as a number of slots, a number of symbols, and/or a number of milliseconds. In some aspects, the UE may indicate the delay period to the network unit. For example, the UE may indicate the delay period to the network unit in the scheduling request transmitted to the network unit at action 910. In some aspects, the delay period may be preconfigured. Additionally or alternatively, the delay period may be indicated by the network unit to the UE. For example, the network unit may indicate the delay period to the UE in the downlink only indicator transmitted to the UE at action 920.

At action 940, the method 900 includes the UE receiving one or more transport blocks (TBs) from the UE. In this regard, the network unit may receive the TB(s) to from the UE using the uplink resources transmitted via the DCI at action 930. The UE may transmit the TB(s) to the network unit after the receiving the indicator indicating the UE to enter the downlink only state by ignoring the downlink only state indicator.

In some aspects, the network unit may receive an acknowledgement (ACK)/negative acknowledgement (NACK) from the UE after transmitting the downlink only state indicator to the UE at action 920. For example, the network unit may transmit a downlink communication (e.g., a PDSCH communication, a PDCCH communication, or other suitable communication) to the UE prior to receiving the scheduling request at action 910. The UE may receive the downlink only state indicator, ignore the downlink only state indicator (e.g., not enter the downlink only state) and transmit the ACK/NACK associated with the prior downlink communication to the network unit.

Further aspects of the present disclosure include the following:

Aspect 1 includes a method of wireless communication performed by a user equipment (UE), the method comprising transmitting, to a network unit, a scheduling request associated with uplink resources; receiving, from the network unit, an indicator indicating the UE to enter a downlink only state; monitoring for first downlink control information (DCI) without entering the downlink only state, wherein the DCI comprises an indicator of the uplink resources; and transmitting, to the network unit after the receiving the indicator indicating the UE to enter the downlink only state, one or more transport blocks (TBs) via the uplink resources.

Aspect 2 includes the method of aspect 1, further comprising transmitting, to the network unit, a request to enter the downlink only state, wherein the receiving the indicator indicating the UE to enter the downlink only state comprises receiving the indicator in response to the request.

Aspect 3 includes the method of any of aspects 1-2, wherein the receiving the indicator indicating the UE to enter the downlink only state comprises receiving the indicator via a second DCI.

Aspect 4 includes the method of any of aspects 1-3, further comprising: receiving, in a buffer of the UE, the one or more TBs, wherein the transmitting the scheduling request comprises transmitting the scheduling request based on a latency budget associated with the one or more TBs.

Aspect 5 includes the method of any of aspects 1-4, wherein the transmitting the scheduling request comprises transmitting the scheduling request in a first slot; and the receiving the indicator indicating the UE to enter the downlink only state comprises receiving the indicator in a second slot immediately following the first slot.

Aspect 6 includes the method of any of aspects 1-5, further comprising transmitting, to the network unit via at least one of a medium access control control element (MAC-CE) or uplink control information (UCI), a request to exit the downlink only state.

Aspect 7 includes the method of any of aspects 1-6, wherein the transmitting the scheduling request comprises transmitting the scheduling request in a first slot; and the monitoring for the first DCI comprises monitoring for the first DCI in a second slot immediately following the first slot.

Aspect 8 includes the method of any of aspects 1-7, further comprising receiving, in a buffer of the UE, the one or more TBs, wherein the transmitting the scheduling request comprises transmitting the scheduling request based on a size of the one or more TBs.

Aspect 9 includes the method of any of aspects 1-8, wherein the monitoring for the first DCI comprises monitoring for the first DCI after a delay period following the transmitting the scheduling request.

Aspect 10 includes the method of any of aspects 1-9, further comprising receiving, from the network unit prior to transmitting the scheduling request, a downlink communication; and transmitting, to the network unit, a negative acknowledgement associated with the downlink communication.

Aspect 11 includes the method of any of aspects 1-10, wherein the scheduling request indicates the UE has not entered the downlink only state; and the transmitting the scheduling request comprises transmitting the scheduling request before receiving the indicator indicating the UE to enter the downlink only state.

Aspect 12 includes a method of wireless communication performed by a network unit, the method comprising receiving, from a user equipment (UE), a scheduling request associated with uplink resources; transmitting, to the UE, an indicator indicating the UE to enter a downlink only state; transmitting, to the UE, first downlink control information (DCI), wherein the DCI comprises an indicator of the uplink resources; and receiving, from the UE after the transmitting the indicator indicating the UE to enter the downlink only state, one or more transport blocks (TBs) via the uplink resources.

Aspect 13 includes the method of aspect 12, further comprising receiving, from the UE, a request to enter the downlink only state, wherein the transmitting the indicator indicating the UE to enter the downlink only state comprises transmitting the indicator in response to the request.

Aspect 14 includes the method of any of aspects 12-13, wherein the transmitting the indicator indicating the UE to enter the downlink only state comprises transmitting the indicator via a second DCI.

Aspect 15 includes the method of any of aspects 12-14, wherein the receiving the scheduling request comprises receiving the scheduling request based on a latency budget associated with the one or more TBs.

Aspect 16 includes the method of any of aspects 12-15, wherein the receiving the scheduling request comprises receiving the scheduling request in a first slot; and the transmitting the indicator indicating the UE to enter the downlink only state comprises transmitting the indicator in a second slot immediately following the first slot.

Aspect 17 includes the method of any of aspects 12-16, further comprising receiving, from the UE via at least one of a medium access control control element (MAC-CE) or uplink control information (UCI), a request to exit the downlink only state.

Aspect 18 includes the method of any of aspects 12-17, wherein the receiving the scheduling request comprises receiving the scheduling request based on a size of the one or more TBs.

Aspect 19 includes the method of any of aspects 12-18, further comprising transmitting, to the UE prior to receiving the scheduling request, a downlink communication; and receiving, from the UE, a negative acknowledgement associated with the downlink communication.

Aspect 20 includes the method of any of aspects 12-19, wherein the scheduling request indicates the UE has not entered the downlink only state; and the receiving the scheduling request comprises receiving the scheduling request before transmitting the indicator indicating the UE to enter the downlink only state.

Aspect 21 includes a non-transitory computer-readable medium storing one or more instructions for wireless communication, the one or more instructions comprising one or more instructions that, when executed by one or more processors of a UE perform any one of aspects 1-11.

Aspect 22 includes a non-transitory computer-readable medium storing one or more instructions for wireless communication, the one or more instructions comprising one or more instructions that, when executed by one or more processors of a network unit, cause the network unit to perform any one of aspects 12-20.

Aspect 23 includes a UE comprising one or more means to perform any one or more of aspects 1-11.

Aspect 24 includes a network unit comprising one or more means to perform any one or more of aspects 12-20.

Aspect 25 includes a UE comprising a memory; a transceiver; and at least one processor coupled to the memory and the transceiver, wherein the UE is configured to perform any one or more of aspects 1-11.

Aspect 26 includes a network unit comprising a memory; a transceiver; and at least one processor coupled to the memory and the transceiver, wherein the network unit is configured to perform any one or more of aspects 12-20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   transmitting, to a network unit, a scheduling request associated with uplink resources;
   receiving, from the network unit, an indicator indicating the UE to enter a downlink only state;

monitoring for first downlink control information (DCI) without entering the downlink only state, wherein the DCI comprises an indicator of the uplink resources; and
transmitting, to the network unit after the receiving the indicator indicating the UE to enter the downlink only state, one or more transport blocks (TBs) via the uplink resources.

2. The method of claim 1, further comprising:
transmitting, to the network unit, a request to enter the downlink only state, wherein the receiving the indicator indicating the UE to enter the downlink only state comprises receiving the indicator in response to the request.

3. The method of claim 1,
wherein the receiving the indicator indicating the UE to enter the downlink only state comprises receiving the indicator via a second DCI.

4. The method of claim 1, further comprising:
receiving, in a buffer of the UE, the one or more TBs, wherein the transmitting the scheduling request comprises transmitting the scheduling request based on a latency budget associated with the one or more TBs.

5. The method of claim 1, wherein:
the transmitting the scheduling request comprises transmitting the scheduling request in a first slot; and
the receiving the indicator indicating the UE to enter the downlink only state comprises receiving the indicator in a second slot immediately following the first slot.

6. The method of claim 1, further comprising:
transmitting, to the network unit via at least one of a medium access control control element (MAC-CE) or uplink control information (UCI), a request to exit the downlink only state.

7. The method of claim 1, wherein:
the transmitting the scheduling request comprises transmitting the scheduling request in a first slot; and
the monitoring for the first DCI comprises monitoring for the first DCI in a second slot immediately following the first slot.

8. The method of claim 1, further comprising:
receiving, in a buffer of the UE, the one or more TBs, wherein the transmitting the scheduling request comprises transmitting the scheduling request based on a size of the one or more TBs.

9. The method of claim 1,
wherein the monitoring for the first DCI comprises monitoring for the first DCI after a delay period following the transmitting the scheduling request.

10. The method of claim 1, further comprising:
receiving, from the network unit prior to transmitting the scheduling request, a downlink communication; and
transmitting, to the network unit, a negative acknowledgement associated with the downlink communication.

11. The method of claim 1, wherein:
the scheduling request indicates the UE has not entered the downlink only state; and
the transmitting the scheduling request comprises transmitting the scheduling request before receiving the indicator indicating the UE to enter the downlink only state.

12. A method of wireless communication performed by a network unit, the method comprising:
receiving, from a user equipment (UE), a scheduling request associated with uplink resources;
transmitting, to the UE, an indicator indicating the UE to enter a downlink only state;
transmitting, to the UE, first downlink control information (DCI), wherein the DCI comprises an indicator of the uplink resources; and
receiving, from the UE after the transmitting the indicator indicating the UE to enter the downlink only state, one or more transport blocks (TBs) via the uplink resources.

13. The method of claim 12, further comprising:
receiving, from the UE, a request to enter the downlink only state, wherein the transmitting the indicator indicating the UE to enter the downlink only state comprises transmitting the indicator in response to the request.

14. The method of claim 12,
wherein the transmitting the indicator indicating the UE to enter the downlink only state comprises transmitting the indicator via a second DCI.

15. The method of claim 12, wherein:
the receiving the scheduling request comprises receiving the scheduling request in a first slot; and
the transmitting the indicator indicating the UE to enter the downlink only state comprises transmitting the indicator in a second slot immediately following the first slot.

16. A user equipment (UE) comprising:
one or more memories;
one or more transceivers; and
at least one processor coupled to the one or more memories and the one or more transceivers, wherein the UE is configured to:
transmit, to a network unit, a scheduling request associated with uplink resources;
receive, from the network unit, an indicator indicating the UE to enter a downlink only state;
monitor for first downlink control information (DCI) without entering the downlink only state, wherein the DCI comprises an indicator of the uplink resources; and
transmit, to the network unit after the receiving the indicator indicating the UE to enter the downlink only state, one or more transport blocks (TBs) via the uplink resources.

17. The UE of claim 16,
wherein the UE is further configured to:
transmit, to the network unit, a request to enter the downlink only state; and
receive the indicator in response to the request.

18. The UE of claim 16,
wherein the UE is further configured to:
receive the indicator via a second DCI.

19. The UE of claim 16,
wherein the UE is further configured to:
receive, in a buffer of the UE, the one or more TBs; and
transmit the scheduling request based on a latency budget associated with the one or more TBs.

20. The UE of claim 16,
wherein the UE is further configured to:
transmit the scheduling request in a first slot; and
receive the indicator in a second slot immediately following the first slot.

21. The UE of claim 16,
wherein the UE is further configured to:
transmit, to the network unit via at least one of a medium access control control element (MAC-CE) or uplink control information (UCI), a request to exit the downlink only state.

22. The UE of claim 16,
wherein the UE is further configured to:
- transmit the scheduling request in a first slot; and
- monitor for the first DCI in a second slot immediately following the first slot.

23. The UE of claim 16,
wherein the UE is further configured to:
- receiving, in a buffer of the UE, the one or more TBs; and
- transmit the scheduling request based on a size of the one or more TBs.

24. The UE of claim 16,
wherein the UE is further configured to:
- monitor for the first DCI after a delay period following the transmitting the scheduling request.

25. The UE of claim 16,
wherein the UE is further configured to:
- receive, from the network unit prior to transmitting the scheduling request, a downlink communication; and
- transmit, to the network unit, a negative acknowledgement associated with the downlink communication.

26. The UE of claim 16,
wherein the scheduling request indicates the UE has not entered the downlink only state; and
the UE is further configured to transmit the scheduling request before receiving the indicator indicating the UE to enter the downlink only state.

27. A network unit comprising:
one or more memories;
one or more transceivers; and
at least one processor coupled to the one or more memories and the one or more transceivers, wherein the network unit is configured to:
- receive, from a user equipment (UE), a scheduling request associated with uplink resources;
- transmit, to the UE, an indicator indicating the UE to enter a downlink only state;
- transmit, to the UE, first downlink control information (DCI), wherein the DCI comprises an indicator of the uplink resources; and
- receive, from the UE after the transmitting the indicator indicating the UE to enter the downlink only state, one or more transport blocks (TBs) via the uplink resources.

28. The network unit of claim 27,
wherein the network unit is further configured to:
- receive, from the UE, a request to enter the downlink only state, wherein the transmitting the indicator indicating the UE to enter the downlink only state comprises transmitting the indicator in response to the request.

29. The network unit of claim 27,
wherein the network unit is further configured to:
- transmit the indicator via a second DCI.

30. The network unit of claim 27,
wherein the network unit is further configured to:
- receive the scheduling request in a first slot; and
- transmit the indicator in a second slot immediately following the first slot.

\* \* \* \* \*